United States Patent
Maillet

(10) Patent No.: US 7,712,764 B2
(45) Date of Patent: May 11, 2010

(54) DRAW PIN HITCHES

(75) Inventor: Thibaut Jean-Robert Maillet, Bonlier (FR)

(73) Assignee: AGCO SA, Beauvais (FR)

( * ) Notice: Subject to any disclaimer, the term of this patent is extended or adjusted under 35 U.S.C. 154(b) by 266 days.

(21) Appl. No.: 11/923,891

(22) Filed: Oct. 25, 2007

(65) Prior Publication Data

US 2008/0100034 A1    May 1, 2008

(30) Foreign Application Priority Data

Oct. 31, 2006   (GB) ................... 0621619.6

(51) Int. Cl.
   *B60D 1/02*   (2006.01)
(52) U.S. Cl. ...................... 280/515; 280/504
(58) Field of Classification Search ................... 280/515
   See application file for complete search history.

(56) References Cited

U.S. PATENT DOCUMENTS

| | | | | |
|---|---|---|---|---|
| 2,593,247 A | * | 4/1952 | Benteman | 280/515 |
| 2,654,613 A | * | 10/1953 | Blair et al. | 280/515 |
| 3,190,677 A | * | 6/1965 | Robbins | 280/515 |
| 4,552,377 A | * | 11/1985 | Folkerts | 280/515 |
| 4,783,094 A | * | 11/1988 | Sands | 280/515 |
| 5,193,838 A | * | 3/1993 | Olson | 280/515 |
| 5,769,559 A | * | 6/1998 | Olson | 403/322.1 |
| 5,921,699 A | * | 7/1999 | Olson | 403/322.1 |
| 6,193,260 B1 | * | 2/2001 | Homan et al. | 280/515 |
| 6,758,486 B1 | * | 7/2004 | Kollath | 280/515 |
| 7,048,294 B2 | * | 5/2006 | Heitlinger | 280/507 |
| 7,416,206 B2 | * | 8/2008 | Buerkle | 280/515 |
| 7,478,823 B2 | * | 1/2009 | Doubet et al. | 280/515 |
| 7,478,824 B2 | * | 1/2009 | Buerkle et al. | 280/515 |
| 7,516,975 B2 | * | 4/2009 | Lair et al. | 280/515 |
| 7,530,592 B2 | * | 5/2009 | Heitlinger et al. | 280/515 |
| 2008/0067785 A1 | * | 3/2008 | Buerkle et al. | 280/515 |

* cited by examiner

*Primary Examiner*—Lesley Morris
*Assistant Examiner*—Michael R Stabley

(57) ABSTRACT

A draw pin hitch has a lower jaw, an upper jaw positioned above the lower jaw, and a draw pin receivable generally vertically in apertures in the upper and lower jaws for coupling elements to the hitch between the jaws. The hitch has a pin holding means which is moveable between a "pin raised" position in which the pin is supported by the pin holding means in the aperture of the upper jaw but does not project between the jaws, and a "pin lowered" position in which the holding means allows the pin to extend through both apertures between the jaws. The pin holding means at least partially encircles at least one of the jaws and is moveable between the "pin raised" and "pin lowered" positions by contact of an implement to be coupled to the hitch with a portion of the holding means. When in the "pin raised" position the holding means at least partially extends across the lower end of the aperture in the upper jaw.

8 Claims, 3 Drawing Sheets

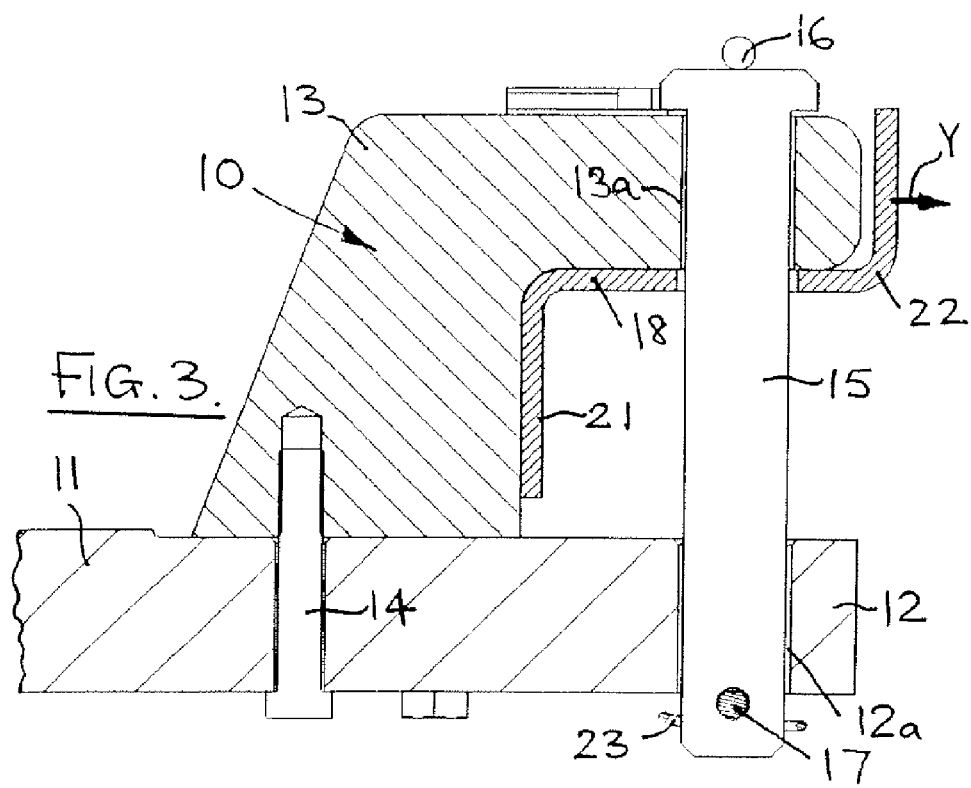
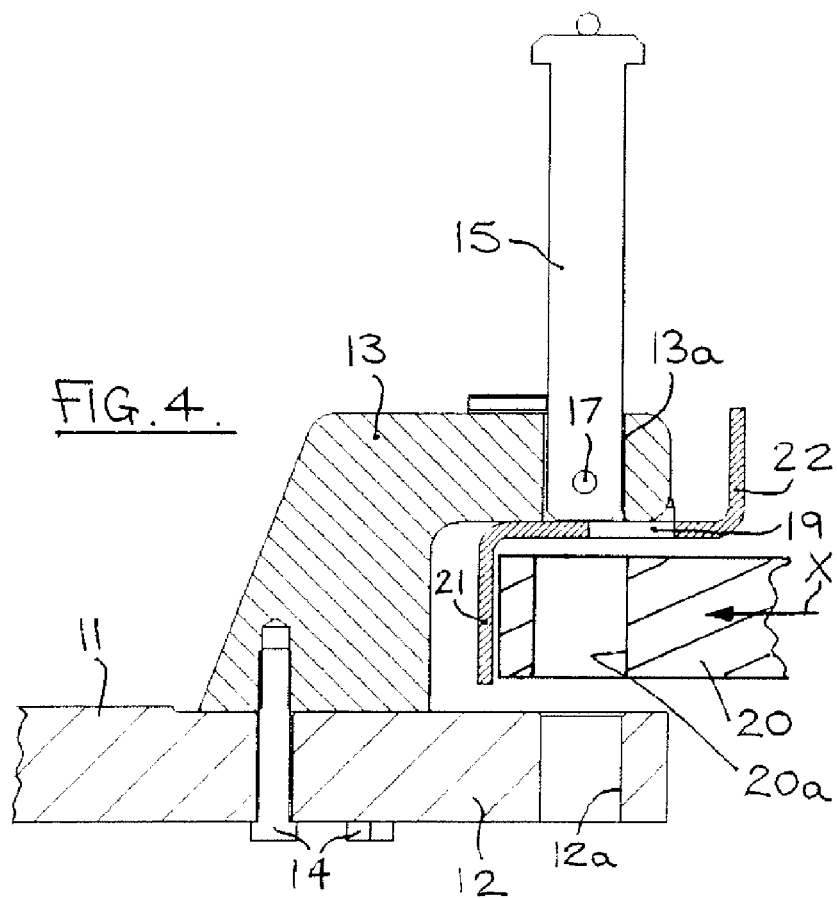

DRAW PIN HITCHES

This application is based on, and claims the benefit of priority to, UK application GB 0621619.6, filed 31 Oct. 2006, which priority application is hereby incorporated by reference.

BACKGROUND OF THE INVENTION

1. Field of the Invention

This invention relates to draw pin hitches of the type, hereinafter referred to as being of the type described, having a lower jaw, an upper jaw positioned above the lower jaw, and a draw pin receivable generally vertically in apertures in the upper and lower jaws for coupling elements to the hitch between the jaws, the hitch having a pin holding means which is moveable between a "pin raised" position in which the pin is supported by the pin holding means in the aperture of the upper jaw but does not project between the jaws, and a "pin lowered" position in which the holding means allows the pin to extend through both apertures between the jaws, the pin holding means being moveable between the "pin raised" and "pin lowered" positions by contact of an implement to be coupled to the hitch with a portion of the holding means.

2. Description of Related Art

An example of a hitch of the type described is shown in U.S. Pat. No. 5,769,559 which, although efficient in operation, is relatively expensive to produce. It is an object of the present invention to provide a simple and inexpensive hitch of the type described.

BRIEF SUMMARY OF THE INVENTION

Thus according to the present invention there is provided a draw pin hitch of the type described in which the pin holding means includes a pin holding member which at least partially encircles at least one of the jaws and which when in its "pin raised" position at least partially extends across the lower end of the aperture in the upper jaw.

In a preferred arrangement the pin holding means slides on the upper jaw. The holding means can conveniently be made from sheet metal material.

The portion of the pin holding means which is contacted by the implement comprises an arm on the pin holding means which is located between the jaws.

The pin holding means preferably includes a tab located adjacent the end of the upper jaw when the pin holding means is in the "pin lowered" position, the tab being provided for movement of the holding means to the "pin raised" position.

BRIEF DESCRIPTION OF THE DRAWINGS

The present invention will now be described, by way of example only, with reference to the accompanying drawings in which:

FIGS. 3 and 4 are sectional views of the hitch in its pin lowered and pin raised positions respectively.

BRIEF DESCRIPTION OF THE PREFERRED EMBODIMENTS

Figure 1:
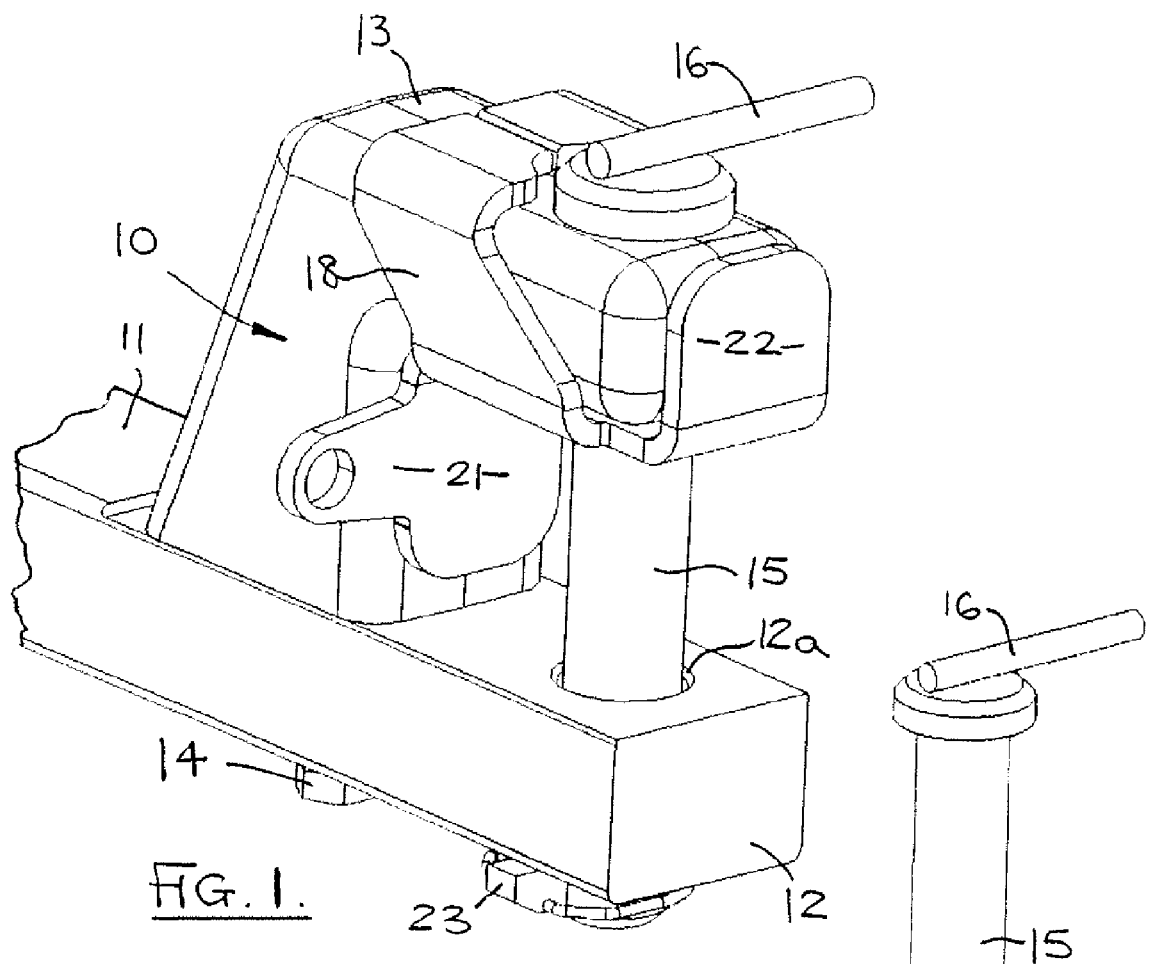
FIG. 1 shows a perspective view of a draw pin hitch embodying the present invention with the pin in its lowered position.

Referring to the drawings, the draw pin hitch 10 comprises a draw bar 11 which terminates in lower jaw portion 12 and which has an upper jaw portion 13 bolted thereto by bolts 14. The lower jaw 12 and the upper jaw 13 both have apertures 12a and 13a respectively in which operates a draw pin 15 which has a handle 16 at its upper end and a hole 17 at its lower end.

Figure 2:
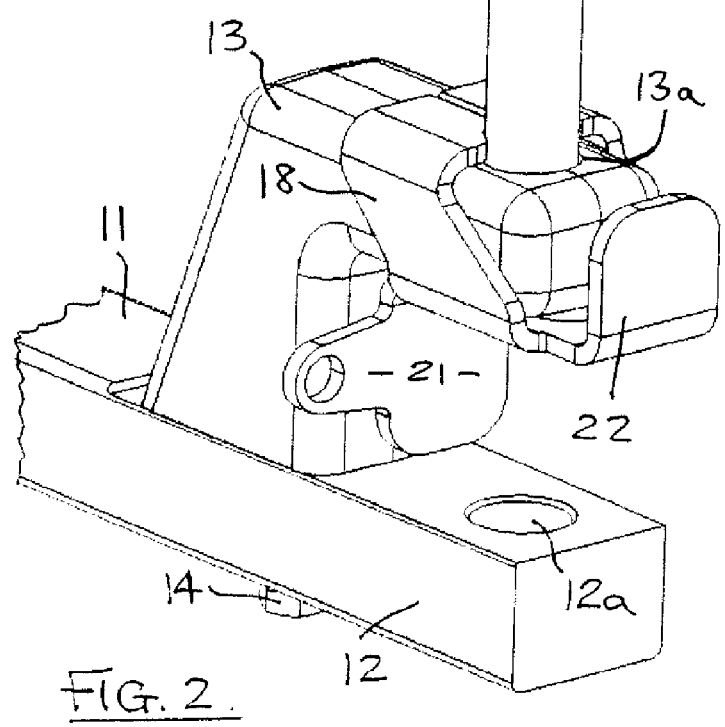
FIG. 2 shows the pin in its raised position.

In accordance with the present invention, encircling the upper jaw 14 is a pin holding means 18 which is slideable on the upper jaw between a so-called "pin raised" position shown in FIGS. 2 and 4 and so-called "pin lowered" position shown in FIGS. 1 and 3.

The pin holding means, which is formed from sheet metal material, has an aperture 19 therein which, when the holding means is in the "pin lowered" position, is in alignment with the aperture 13a in the upper jaw so that the draw pin 15 can drop under its own weight to engage the aperture 12a in the lower jaw 12. When the pin holding means is in the pin raised position shown in FIGS. 2 and 4 the aperture 19 is not fully aligned with the aperture 13a in the upper jaw 13 so that the draw pin 15 is retained in its raised position with the lower ends of the aperture 13a partially blocked by the pin holding means.

The pin holding means is moved from the raised position shown in FIGS. 2 and 4 to the lowered position shown in FIGS. 1 and 3 by contact of a coupling portion 20 of an implement to be coupled to the hitch with a arm 21 formed on the portion of the holding means 18 which is located between the jaws 12 and 13. As will be appreciated, as the coupling portion 20 is moved in the direction of the arrow X (see FIG. 4) this moves the holding means 18 from the position shown in FIG. 4 to the position shown in FIG. 3 thus allowing the draw pin 15 to drop to the lowered position so that it can pass through the coupling bore 20a in the coupling portion 20 of the implement.

The holding means includes a tab 22 which can be pulled in the direction of the arrow Y of FIG. 3 to move the holding means to back to the FIG. 4 position when the draw pin has been raised.

A lynch pin 23 can be inserted through the hole 17 in draw pin 15 to lock the draw pin in the lowered position.

As will be appreciated, the draw pin hitch of the present invention provides a particularly simple but efficient method of holding the draw pin 15 in the raised position but also allowing automatic lowering of the draw pin when a coupling portion 20 of an implement is introduced between the jaws 12 and 13 of the hitch.

Its is possible of the holding means 18 to be mounted so that it encircles the lower jaw 12 rather than the upper jaw 13 or so that it encircles both jaws. Also, the encircling of the upper and/or lower jaws may not be a complete encirclement but simply sufficient to retain the holding means 18 in position between the jaws 12 and 13.

Figure 5:
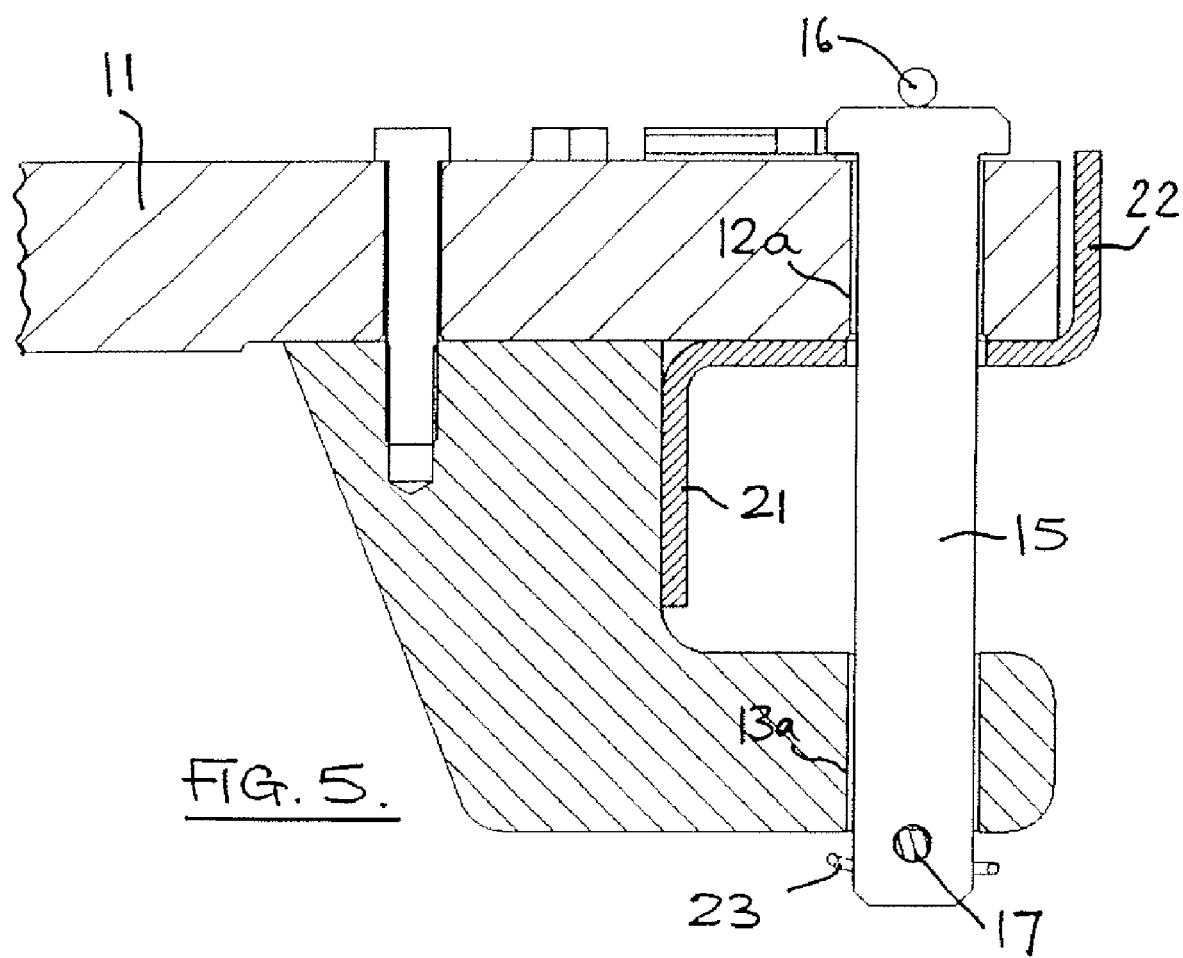
FIG. 5 shows the draw pin hitch turned over to provide a lower hitch point.

Further, if desired the drawbar can be turned over as shown in FIG. 5 to provide a lower hitch point with the holding means 18 mounted around the jaw 12.

I claim:

1. A draw pin hitch having a lower jaw, an upper jaw positioned above the lower jaw, and a draw pin receivable generally vertically in apertures in the upper and lower jaws for coupling elements to the hitch between the jaws, the hitch having a pin holding means which is moveable between a "pin raised" position in which the underside of the pin is supported by the pin holding means in the aperture of the upper jaw but does not project between the jaws, and a "pin lowered" position in which the holding means allows the pin to extend through both apertures between the jaws, the pin holding means being moveable between the "pin raised" and "pin lowered" positions by contact of an implement to be coupled to the hitch with a portion of the holding means, the holding means at least partially encircling at least one of the jaws and when in its "pin raised" position at least partially extends across the underside of the aperture in the upper jaw.

2. A hitch according to claim 1 in which the holding means slides on the upper jaw.

3. A hitch according to claim 1 in which the holding means slides on the lower jaw.

4. A hitch according to claim 1 in which the holding means is made from sheet metal material.

5. A hitch according to claim 1 in which the portion of the pin holding means which is contacted by the implement comprises an arm on the pin holding means which is located between the jaws.

6. A hitch according to claim 1 in which the holding means includes a tab located adjacent the end of the upper jaw when the holding means is in the pin lowered position for movement of the holding means to its pin raised position.

7. A hitch according to claim 4 in which the holding means comprises an aperture which is aligned underneath the aperture in the upper jaw when in the "pin lowered" position and is displaced from alignment when in the "pin raised" position so as to at least partially cover the underside of the aperture in the upper jaw.

8. A hitch according to claim 2 in which the holding means slides in a fore and aft direction when moving between the "pin lowered" and "pin raised" positions.

* * * * *